//  3,557,282
// METHOD OF REGULATING ESTRUS IN THE CAT
// Leonard J. Lerner, Cranbury, N.J., assignor to E. R. Squibb & Sons, Inc., New York, N.Y., a corporation of Delaware
// No Drawing. Filed Jan. 2, 1969, Ser. No. 789,068
// Int. Cl. A61k 17/06
// U.S. Cl. 424—241                    9 Claims

ABSTRACT OF THE DISCLOSURE

This invention relates to a method for the regulation or estrus in the cat by providing to the cat a composition comprising 0.25 to 25.0 mg. of a 16α,17α-acetal or ketal derivative of 16α,17α - dihydroxyprogesterone on a daily basis. The material may be provided in a prepared cat food or in a food or vitamin supplement such as cod liver oil.

DETAILED DESCRIPTION OF THE INVENTION

Fertility regulation of cats is presently most commonly accomplished by spaying, permanently rendering the female incapable of reproducing. It has now been found that fertility regulation of cats may be achieved by interrupting or inhibiting estrus in the female cat, nonsurgically, which comprises providing the female cat with 0.25 to 25.0 mg., preferably 1.0 to 10.0 mg., daily of a 16α,17α-acetal or ketal derivative of 16α,17α-dihydroxy-progesterone.

The 16α,17α-acetal and ketal derivatives of 16α,17α-dihydroxyprogesterone which may be used according to this invention have the formula

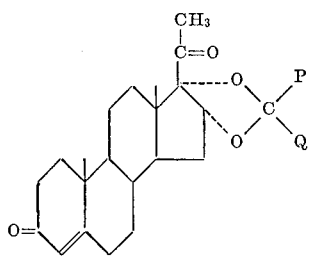

wherein P is hydrogen, a lower alkyl radical, a monocyclic aromatic radical, a monocyclic aromatic lower alkyl radical, a monocyclic heterocyclic radical, or a monocyclic heterocyclic lower alkyl radical; Q is a monocyclic aromatic radical, a monocyclic aromatic lower alkyl radical, a monocyclic heterocyclic radical, or a monocyclic heterocyclic lower alkyl radical; or together P and Q is a heterocyclic radical.

These compounds and the method of preparing them are more fully described in U.S. Patent 2,941,997, issued June 21, 1960. Preferred within the group are 16α,17α-dihydroxyprogesterone acetophenonide and the methyl-ethyl ketal of 16α,17α-dihydroxyprogesterone.

The administration of one of these compounds or a mixture of any of them on a daily basis prevents the onset of heat without adverse effects. While the omission of a single daily dose or even an alternate day regimen is permissible, it is best that the substance be administered on a daily regimen. Missing two or more consecutive doses can, however, be detrimental to the estrus control program. The inhibition of estrus is reversible upon discontinuance of use of the acetal or ketal derivative of 16α,17α-dihydroxyprogesterone.

The compound may be incorporated in a pet food or in another food or nutrient supplement provided to the cat on a daily basis in an amount sufficient to provide 0.25 to 25 mg. daily. The most convenient means is to include the acetal or ketal derivative of 16α,17α-dihydroxyprogesterone or mixture of such derivatives in a prepared cat food containing liver, chicken, beef, fish means or meals, cereal grains, soy beans, dairy products, edible oils, etc., or combinations of these generally available under various trade names in pet or food stores.

The acetal or ketal derivative of 16α,17α-dihydroxyprogesterone may be thoroughly admixed with and dispersed through the cat food during its preparation in an amount of about 0.25 mg. to 10 mg. per ounce of cat food. To aid in the mixing and dispersion, the compound may first be dissolved in a minimum amount of edible oil in which it is soluble, e.g., cod liver oil, sesame oil, corn oil, vegetable oils or the like.

As an alternative, the acetal or ketal derivative of 16α,17α-dihydroxyprogesterone may be supplied in an edible oil in which it is soluble, such as one of those mentioned above, for administration directly to the animal by dropper. This may take the form of a vitamin and/or mineral supplement frequently used to supplement the animal's diet to maintain it in a healthy condition. Thus, for example, the compounds may be dissolved in cod liver oil, in a concentration of about 5 to 100 mg. per ml. to be administered by dropper to the female cat in amounts of 0.1 to 1.0 ml. once each day. The cod liver oil may also include supplemental vitamins and minerals. Preparations of the type which may be used as vehicles are available commercially in food, pet stores or wherever pet foods are sold, under various trade names.

As an alternative to directly placing the oil solution into the cat's mouth, the liquid may be dropped in the same amount, into or on any food, prepared or table food or scrap, provided to the animal.

The daily use of the indicated amount of the 16α,17α-dihydroxyprogesterone acetophenide in the simple manner indicated results in the inhibition of estrus in the female cat without adverse effect. Upon cessation of use of the substance, normal estrus cycles resume. As indicated, the omission of a single dose is not detrimental, administration on an alternate day regimen is permissible, but the omission of two or more consecutive doses may interfere with estrus control.

The following examples are illustrative:

Example 1

A solution containing 10 mg./ml. of 16α,17α-dihydroxyprogesterone acetophenide in cod liver oil is thoroughly admixed in an amount of 30 mg. per pound with a mixed cat food containing a meat and grain meal combination. The cat food mixture is sealed in 1 lb. cans in conventional manner. The sealed cans are processed by heating at about 40 to 50° for 20 to 30 minutes. The cans are cooled and labelled. About one-third can per day is fed to the female cat.

Example 2

12 mg. of 16α,17α-dihydroxyprogesterone acetophenide in 1.2 ml. of cod liver oil are thoroughly mixed with the contents of a 6 oz. can of a prepared tuna fish cat food (marketed under the trade name Purr) and fed to the female cat on a daily basis.

Example 3

A solution containing 10 mg. of 16α,17α-dihydroxyprogesterone acetophenide per ml. of cod liver oil is admixed with ground fish in an amount of 32 ml. per pound. The fish is formed into small balls of one-half ounce each. Seven balls are sealed into a can and the cans are processed as in Example 1. Each can thus contains a week's supply of a cat treat supplied to the female cat on a one-a-day basis.

Example 4

A solution containing 10 mg./ml. of 16α,17α-dihydroxyprogesterone acetophenide in cod liver oil is filled into 30 ml. bottles each fitted with a dropper dispensing 1 ml. One ml. of the oil solution is dropped daily directly into the mouth of the female cat or onto the animal's daily food ration.

Example 5

A solution is prepared containing 15 mg./ml. of the methyl-ethyl ketal of 16α,17α-dihydroxyprogesterone in a mixture of 50 percent cod liver oil and 50 percent mineral oil (by volume). The solution is bottled and used as in Example 4.

This invention may be variously otherwise embodied within the scope of the appended claims.

What is claimed is:

1. In a method of reversibly inhibiting estrus in the fertile female cat without adverse effect, the improvement which comprises feeding to the cat on a daily regime a composition comprising about 0.25 to 25 mg. of 16α,17α-acetal or ketal derivative of 16α,17α-dihydroxyprogesterone in an edible cat food, cat vitamin supplement or cat food supplement vehicle; wherein by said improvement the omission of a single daily dose, or even an alternate daily dose is permissible, although missing two or more consecutive doses is detrimental to estrus control, said estrus inhibition being reversible and normal estrus cycles resuming upon discontinuance of use of the active compound.

2. A method as in claim 1 wherein the composition comprises about 1 to 10 mg. per ml. of active compound in an edible oil.

3. A method as in claim 2 wherein the oil is cod liver oil.

4. A method of inhibiting or interrupting estrus in the female cat which comprises feeding to the female cat a cat in accordance with claim 1 food providing about 0.25 to 25 mg. per day of 16α,17α-acetal or ketal derivative of 16α,17α-dihydroxyprogesterone.

5. A method as in claim 4 wherein the ketal derivative is 16α,17α-dihydroxyprogesterone acetophenide.

6. A method as in claim 5 wherein the amount of active compound is about 1 to 10 mg. per day.

7. A method of inhibiting estrus in the female cat in accordance with claim 1 which comprises administering to the female a cat food supplement or cat vitamin supplement providing about 0.25 to 25 mg. per day of 16α,17α-acetal or ketal derivative of 16α,17α-dihydroxyprogesterone.

8. A method as in claim 7 wherein the ketal derivative is 16α,17α-dihydroxyprogesterone acetophenide.

9. A method as in claim 8 wherein the amount of active ingredient is about 1 to 10 mg. per day.

UNITED STATES PATENTS

| | | | |
|---|---|---|---|
| 2,941,997 | 6/1960 | Fried | 260—239.55 |
| 3,288,679 | 11/1966 | Fried | 424—241 |

OTHER REFERENCES

Moltzen, H.: Proc. 9th Nordic Vet. Congr. Copenhagen (1962), vol. II, pp. 920–923 (1963), "Delaying Oestrus in Dogs and Cats With Perlutex" (Medroxyprogesterone).

Russe, M., et al.: Kleinter-Praxis 8: 87–89 (1963), "Sexual Suppression in Female Dogs and Cats Having Normal or Abnormal Cycles by an Orally Active Gestagen, Norethisterone."

Harris, T. W., et al.: Amer. J. Vet. Res. 24: 1003–1006 (1963), "The Suppression of Estrus in the Dog and Cat With Long-Term Administration of Synthetic Progestational Steroids."

Gerger, H. A., et al.: Vet. Rec. 76: 1089–1093 (1964), "The Effect of Methyl Oestrenolone on Estrus, Pseudo Pregnancy, Vagrancy, Satyriasis and Squirting in Dogs and Cats."

SHEP K. ROSE, Primary Examiner